United States Patent
Hajji

(10) Patent No.: US 6,415,189 B1
(45) Date of Patent: Jul. 2, 2002

(54) METHOD AND SYSTEM FOR PREDICTING DISK DRIVE FAILURES

(75) Inventor: M. Amine Hajji, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,136

(22) Filed: Jul. 23, 1999

(51) Int. Cl.[7] .............................. G05B 9/02; G01M 13/04
(52) U.S. Cl. .............................. 700/79; 700/280; 73/593; 324/662; 714/47
(58) Field of Search ................................ 700/79, 71, 78, 700/80, 280; 73/593, 659, 660; 340/682, 683; 714/47, 44, 48; 702/184, 185, 34; 360/69; 324/662, 686; 310/90.5

(56) References Cited

U.S. PATENT DOCUMENTS

| | | | |
|---|---|---|---|
| 4,237,454 A | 12/1980 | Meyer | 340/682 |
| 4,528,852 A | 7/1985 | Söhoel | 73/593 |
| 4,530,240 A | 7/1985 | Board et al. | 73/593 |
| 4,763,523 A | 8/1988 | Womble et al. | 73/587 |
| 4,768,380 A | 9/1988 | Vermeiren et al. | 73/593 |
| 5,036,235 A | * 7/1991 | Kleckner | 310/90.5 |
| 5,083,462 A | 1/1992 | Vermeiren et al. | 73/587 |
| 5,140,858 A | 8/1992 | Nishimoto et al. | 73/587 |
| 5,423,218 A | 6/1995 | Matsuzaki | 73/593 |
| 5,511,422 A | 4/1996 | Hernandez | 73/593 |
| 5,677,488 A | 10/1997 | Monahan et al. | 733/593 |
| 5,936,410 A | * 8/1999 | Dunfield et al. | 324/662 |

OTHER PUBLICATIONS

"Basic Lubrication Theory", A. Cameron, pp. 129–133.
"Hydrodynamic Motors Trim Disk Drive Run Out", Data Storage, Jan. 1998 edition, pp. 27–28 and 30–32.

* cited by examiner

*Primary Examiner*—Leo Picard
*Assistant Examiner*—Steven R. Garland
(74) *Attorney, Agent, or Firm*—Robert B. Martin; Bracewell & Patterson, L.L.P.

(57) ABSTRACT

A method and system within a data processing system for predicting failure of a hard disk drive having a fluid bearing during runtime operation of said hard disk drive, wherein said fluid bearing has an established signature dynamic fluid response. First, a runtime vibration level of the fluid bearing is measured. This runtime vibration level is then translated into a runtime dynamic fluid response which provides an indication of the operating condition of the fluid bearing. The runtime dynamic fluid response is compared with the baseline dynamic fluid response in real-time during operation of the hard disk drive. Finally, in response to a predetermined departure of the runtime dynamic fluid response from the baseline dynamic fluid response, a protective response is initiated, such that data loss within the data storage system due to fluid bearing failure is prevented.

19 Claims, 4 Drawing Sheets

METHOD AND SYSTEM FOR PREDICTING DISK DRIVE FAILURES

BACKGROUND OF THE INVENTION

1. Technical Field

The present invention relates in general to an improved digital storage system. In particular, the present invention relates to a method and system for preventing data loss due to hard disk drive failures. More particularly, the present invention relates to an improved method and system for detecting a precursor to a potential hard disk drive failure prior to any detectable degradation in drive functional performance. Still more particularly, the present invention relates to utilizing signature fluid dynamics within a hard disk drive fluid bearing to determine that corrective action is necessary to protect customer stored data.

2. Description of the Related Art

Generally, a digital data storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The demand for increased speed and storage capacity has resulted in ever faster and more compact hard disk drive assemblies. Modern disk drives typically have several stacked disks that spin on a shaft at speeds exceeding 10,000 rpm. The track densities on these disks are often more than 12,000 tracks per inch (tpi). Traditional spindle motors consisting of a shaft supported by ball bearings have inherent shortcomings in light of the faster, more compact modern HDD's. Some of the problems encountered by such ball bearing spindles include non-repeatable run out (NRRO), limited grease life, and inherent ball bearing noise.

A solution to some of the problems associated with ball bearings has been to replace them with hydrodynamic or fluid bearings. The liquid film within a fluid bearing provides superior damping which results in less NRRO and a quieter motor. The motor's resistance to shock and external vibration is also improved.

A number of known storage subsystems incorporate certain techniques and devices to predict storage device failures, along with other techniques and devices to protect data from being lost or corrupted by such failures. Data storage systems, such as hard disk drives, commonly employ Predictive Failure Analysis (PFA) as a self-diagnostic tool. PFA is usually implemented via micro-code instructions that control drive assemblies. The main purpose of PFA (sometimes referred as Self-Monitoring, Analysis and Reporting Technology, or "SMART") is to issue warnings to users that the hard disk drive is deteriorating and may "crash". PFA is implemented by performing periodic self-diagnostic tests. For example, PFA may be utilized to measure and compare current parameter values against those stored at the time of manufacture. PFA may also be utilized to examine the time rate of change of HDD performance parameters. An example of such a parameter is resolution, which is correlated to the fly height of a magneto-resistive (MR) head. Consistent with current implementations of PFA, a detected increase in resolution beyond some predetermined threshold may trigger a PFA warning.

Current implementations of PFA utilize several electro-mechanical performance parameters within a HDD. These parameters include magneto-resistive (MR) head fly height and Read/Write signal amplitude and resolution. Although current implementations of PFA are intended to warn a system or a user prior to a drive failure that results in loss of user data, the parameters currently serving as failure precursors are directly indicative of the quality of drive operations. Therefore current implementations of PFA are limited to detecting imminent failures with potentially catastrophic loss or corruption of user data.

It would therefore be desirable to provide an improved method and system that would allow the drive control circuitry to monitor a precursor to HDD failure that is itself unrelated to actual drive operability. Such a method and system, if implemented, would be useful by leveraging existing drive error prediction and recovery tools such as PFA and SMART so that potential drive failures may be diagnosed and corrected well before any degradation in drive performance occurs, thus providing maximum protection to user data.

SUMMARY OF THE INVENTION

It is therefore an object of the invention to provide a method and system for improving a digital storage system.

It is another object of the invention to provide an improved method and system for preventing hard disk drive failures.

It is still another object of the invention to provide an improved method and system for detecting a potential hard disk drive failure prior to any detectable degradation in drive functional performance.

It is yet another object of the invention to provide an improved method and system that utilize signature fluid dynamics within a hard disk drive fluid bearing to determine that corrective action is necessary, and undertaking such corrective action, thereby protecting customer data.

The above and other objects are achieved as is now described. A method and system within a data processing system for predicting failure of a hard disk drive having a fluid bearing during runtime operation of said hard disk drive, wherein said fluid bearing has an established signature dynamic fluid response, are disclosed. First, a runtime vibration level of the fluid bearing is measured. This runtime vibration level is translated into a runtime dynamic fluid response which provides an indication of the operating condition of the fluid bearing. The runtime dynamic fluid response is compared with the baseline dynamic fluid response in real-time during operation of the hard disk drive. Finally, in response to a predetermined departure of the runtime dynamic fluid response from the baseline dynamic fluid response, a protective response is initiated, such that data loss within the data storage system due to fluid bearing failure is prevented.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Predictive failure analysis (PFA) is commonly utilized in disk drive controllers as a diagnostic tool. Typically, PFA is implemented via microcode instructions utilized to control local disk drive operations conducted via the disk drive controller. In accordance with the method and system of the present invention, in response to detecting a degradation of a runtime parameter, such as the amplitude of the half-frequency whirl, the microcode will respond by posting an error signal. The disk drive user, or the system itself, may then respond by taking the drive off-line or by taking necessary action (delivering data to another hard disk drive, for example) to protect data that might otherwise be lost or compromised by an imminent failure.

The increasing interest in utilizing fluid bearings in HDD's presents an opportunity to dramatically improve the effectiveness of PFA technology. In addition to conventional PFA systems which rely on indications of actual drive performance degradation, the present invention utilizes key characteristics of fluid bearings as the precursor to spindle failure. One such dynamic fluid response is known as the "half-frequency whirl characteristic" of a fluid bearing. Half-frequency whirl, sometimes referred to as "oil whirl", is a phenomena that occurs when a bearing, such as a journal bearing on a vertical shaft, produces a force 90 degrees out of phase with shaft displacement at approximately half the rotating speed. When left uncontrolled, half-frequency whirl can present a problem in that it tends to destabilize the rotating shaft. Spiral or herringbone grooves within a fluid bearing are often utilized to stabilize the half-frequency whirl.

The amplitude and frequency of the half-frequency whirl of a particular fluid bearing are very sensitive to changes within the bearing. Such changes can be due to spindle bearing functional degradation caused by, for example, bearing oil loss, oil degradation, accumulation of wear and particulate contaminants. Variations in amplitude or frequency of the half-frequency whirl characteristic are detectable well before any measurable degradation in the performance of the hard disk drive. Therefore, utilizing the half-frequency whirl characteristic as the input parameter into a data storage system feature, such as PFA or SMART, provides further insurance that user data will not be lost or corrupted due to spindle bearing failure.

Figure 1:
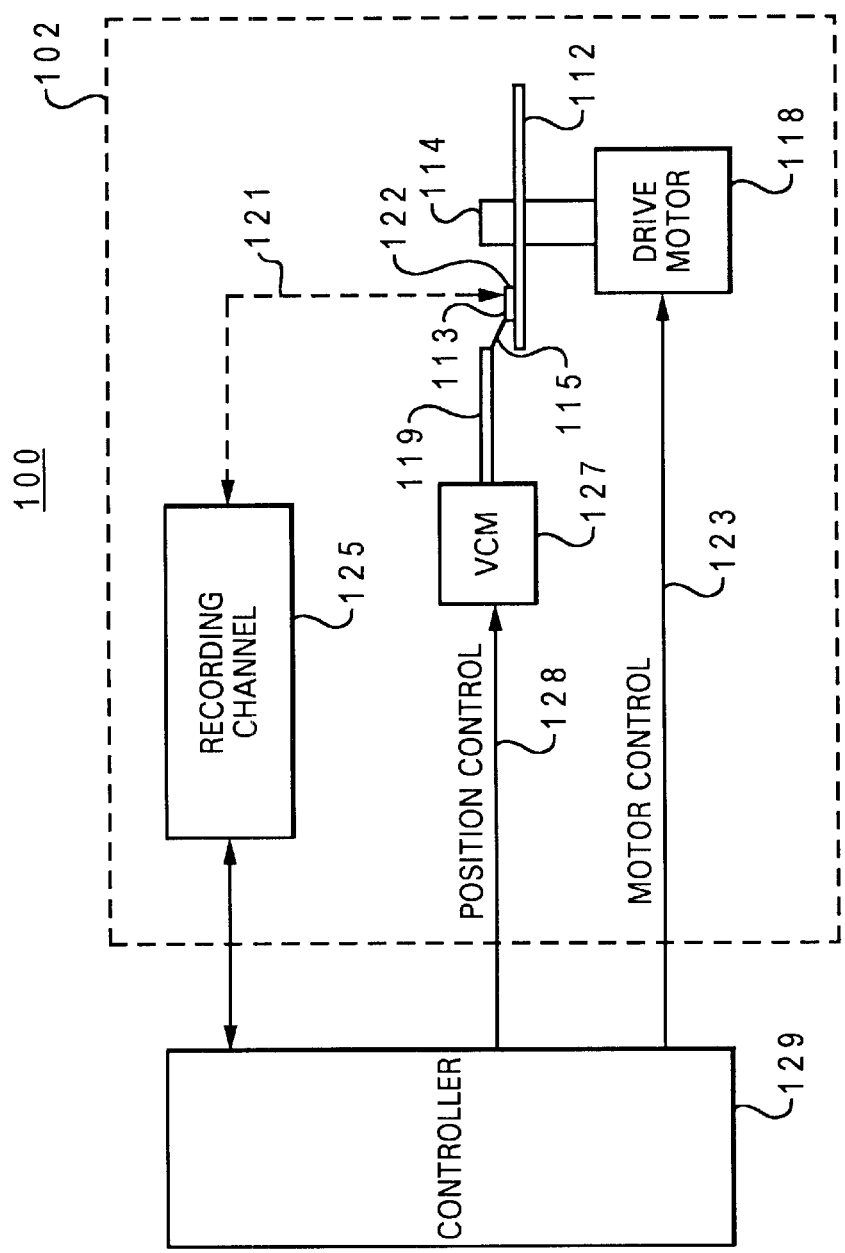
FIG 1. illustrates a block diagram of a hard disk drive suitable for implementing Preventive Failure Action (PFA) in accordance with the teachings of the present invention.

Turning now to FIG. 1, there is depicted a block diagram of a magnetic disk storage system 100, suitable for utilizing an improved PFA in accordance with the teachings of the present invention. The invention described hereinbelow is useful with all electromechanical configurations of magnetic storage disk drives or direct access storage devices (DASD). Included within such configurations in which the present invention may be practiced are multiple drive arrays such as a Redundant Array of Independent Disks (RAID) system. Also, it will be appreciated that the invention is also applicable to, and may be utilized by, other information storage systems such as an optical data storage system that also utilize fluid bearings. Magnetic disk storage system 100 is comprised of a HDD 102 that is electromechanically connected to a disk controller 129 via a recording channel 125, a slider position control line 128, and a motor control line 123.

At least one rotatable magnetic disk 112 is mounted on a spindle/hub 114 that is supported by a fluid bearing within a disk drive motor 218 (not depicted) and rotated by a disk drive motor 118. The magnetic recording media on each disk is generally in the form of an annular pattern of concentric data tracks (not shown) on disk 112. At least one slider 113 is positioned on the rotating disk 112 during normal "read"and "write" operations. Each slider 113 is supporting one or more magnetic read/write heads 121. As the disk(s) rotate, the sliders 113 are moved radially in and out so that the heads 121 may access different portions of the disk surface 122 containing the data. Each slider 113 is attached to an actuator arm 119 by means of a suspension 115. The suspension 115 provides a slight spring force which biases the slider 113 against the rotating disk surface 122. While HDD 102 is at rest, the slider 113 may either be parked on the stationary disk surface 122 or it may be parked on a cantilevered ramp off of disk surface 122 or it may be removed from disk surface 122 by a suitable cam mechanism. Each actuator arm 119 is attached to an actuator means 127. It should be apparent that disk storage systems may contain a large number of disks and actuators, and each actuator may support a number of sliders.

The various components of HDD 102 are controlled in operation by signals generated by disk controller (read/write electronics) 129, such as access control signals and internal clock signals, and which includes logic control circuits, storage means and a microprocessor. Disk controller 129 generates control signals to control various system operations such as motor control signals on line 123 and head position control signals on line 128. The control signals on line 128 provide the desired current profiles to optimally move and position a selected slider 113 to the desired data track on the associated disk 112. Read and write signals are communicated to and from read/write heads 121 by means of recording channel 125, which includes conductor lines running along suspension 115 and actuator arm 119. In this manner, disk controller 129 controls physical and logical access to HDD 102.

Figure 2:
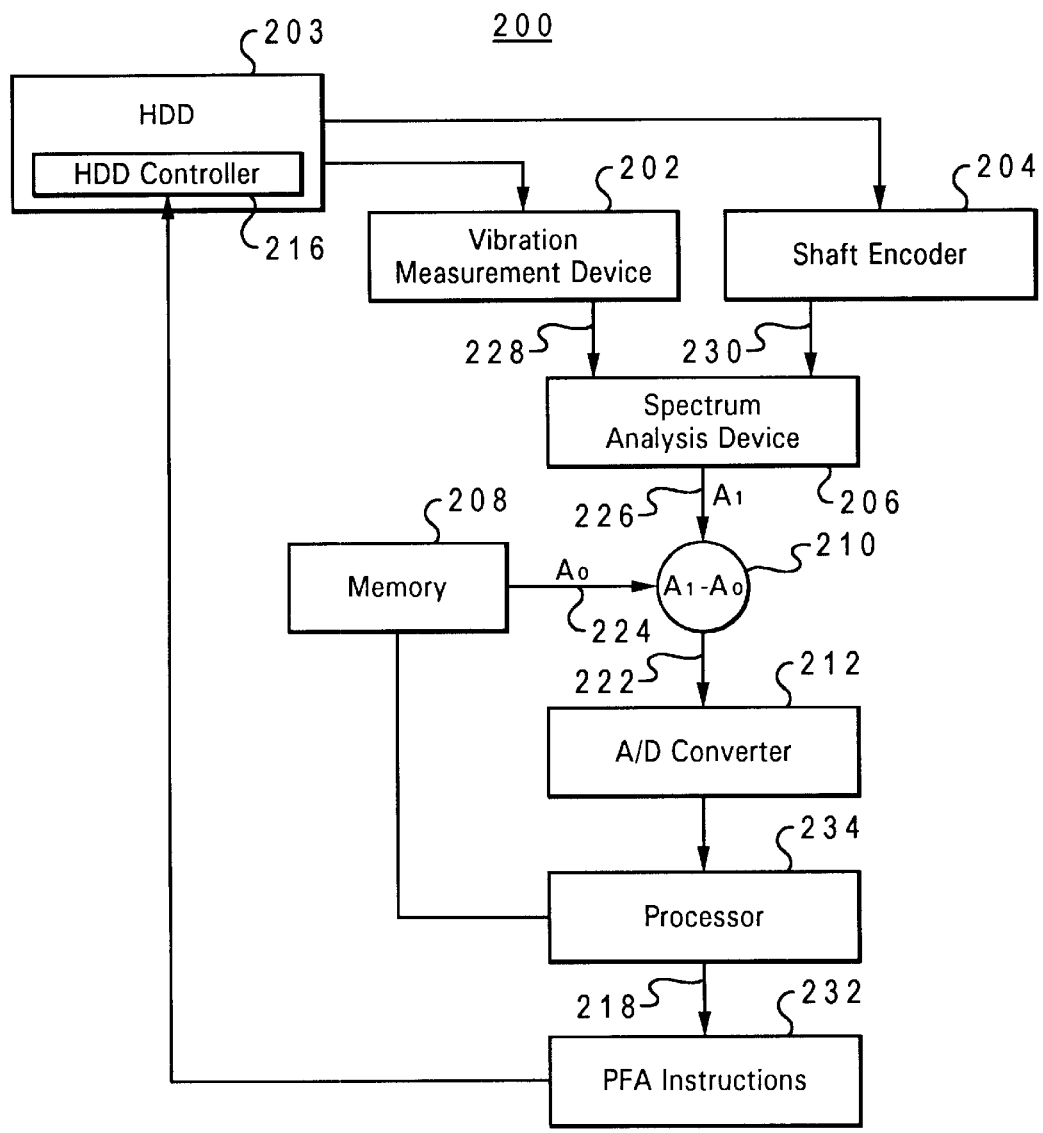
FIG 2. depicts a block diagram of functional entities and operations, within a hard disk drive assembly, that may be utilized to perform runtime Predictive Failure Analysis (PFA)

With reference now to FIG. 2, there is depicted a block diagram of functional entities and signals, within a hard disk drive assembly, that may be utilized to perform runtime PFA. As illustrated in FIG. 2, an HDD failure prediction system 200 includes two input sources: a vibration sensor 202; and a shaft speed sensor 204. Vibration sensor 202 may be a transducer that converts the mechanical vibration level of a fluid bearing into an electric vibration signal 228. Shaft speed sensor 204 detects the rotational speed of the shaft supported by the fluid bearing and issues a shaft speed signal 230 to a spectrum analysis device 206. Spectrum analysis device 206 combines shaft speed signal 230 with vibration signal 228 to selectively parse out the signal components within vibration signal 228 that characterize the half-frequency whirl of the fluid bearing. An example method by which this parsing may be accomplished is by the use of a bandpass filter within spectrum analysis device 206 that passes a bandwidth centered at approximately one-half of the frequency of shaft speed signal 230.

Spectrum analysis device 206 may utilize one or more well-known electric signal filtering and analysis devices such as digital signal processors (DSPs). These devices, and others not mentioned but well-understood in the art, translate vibration signal 228 and shaft speed signal 230 into a format in which a runtime half-frequency whirl can be obtained. The half-frequency whirl is a known dynamic fluid characteristic of fluid bearings in which the bearing produces a force 90 degrees out of phase with the displacement of the rotating shaft. The half-frequency whirl has signature characteristics such as peak amplitude and the frequency at the peak amplitude that are very sensitive to changes within the bearing such as oil loss, degradation, or contamination.

As illustrated in FIG. 2, the output of spectrum analysis device 206 is a half-frequency whirl characteristic signal 226. As mentioned above, both amplitude and frequency of the half-frequency whirl are signature responses that respond to subtle changes in a fluid bearing. Therefore, half-frequency whirl signal 226 may indicate either a runtime amplitude or a runtime frequency or it may be a combination. A comparator device 210 compares runtime half-frequency whirl signal 226 with a stored baseline half-frequency whirl signal 224 which has been stored within memory 208. The degree of divergence between runtime signal 226 and baseline signal 224 is indicated by divergence signal 222 which is converted into a digital format by A/D converter 212 and monitored by processor 234. Processor 234 may be a Central Processing Unit (CPU) of a computer system in which HDD failure prediction system 200 is a subsystem. Processor 234 may also be a smaller processing unit such as a DSP located on the HDD.

Processor 234 maintains communicative contact with a set of PFA instructions 232 that are contained within HDD microcode. When the differential between baseline signal 224 and runtime signal 226 exceeds a predetermined level, PFA instructions 232 are executed either by processor 234, HDD controller 216 or both in order to commence protective action to prevent loss of user data within HDD 203. The protective action commenced may be a warning that is posted according to PFA instructions and may also include automatic transmission of customer data to an adjacent drive. Such warnings and data recovery actions initiated by HDD protection systems such as PFA and SMART are well known in the art and are incorporated herein by reference.

In one embodiment of the present invention, PFA block 232 monitors processed divergence signal 218 which provides an indication of the magnitude of divergence between runtime signal 226 and baseline signal 224. Consistent with PFA operating procedures, processed divergence signal is one of the performance parameters of HDD 203 monitored by PFA block 232 during standby periods of runtime operation. This type of monitoring is well known by those skilled in the art and is often generically referred to as Predictive Failure Analysis (PFA) or Self-Monitoring Analysis and Reporting Technology (SMART). The details regarding various methods of implementing PFA and SMART are well-known in the art and are incorporated herein by reference.

Figure 3A:
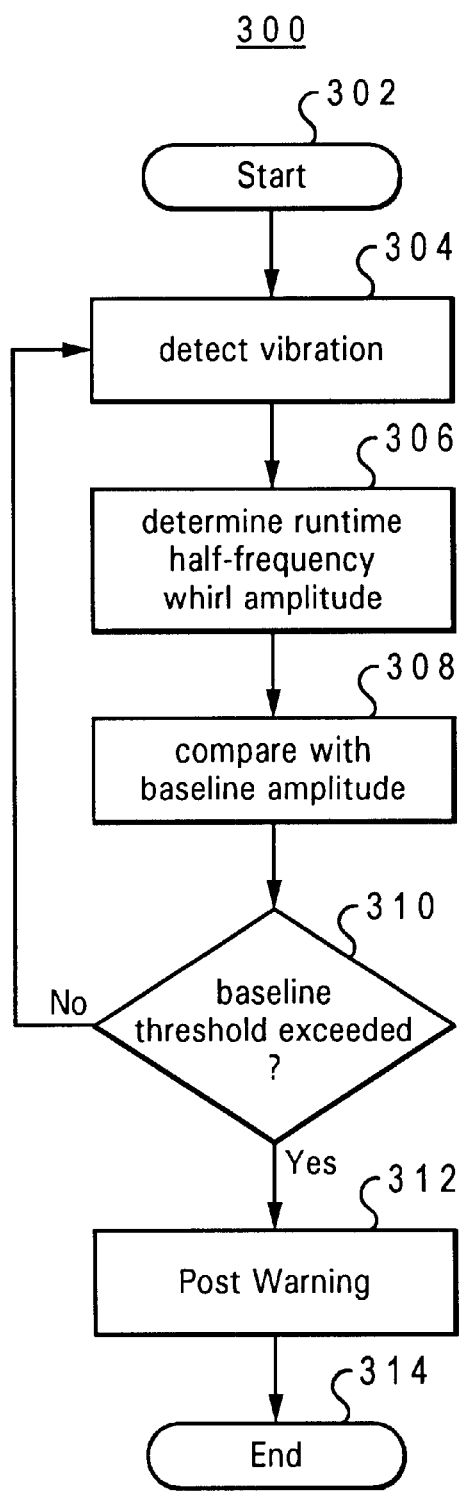
FIG. 3A is a high level flow chart illustrating a sequence of steps that that encompass one embodiment of the present invention in which the amplitude of the half-frequency whirl characteristic of a fluid bearing is utilized as the input parameter into a PFA system.

Turning now to FIG. 3A, there is depicted a high level flow chart 300 illustrating a sequence of steps that that encompass one embodiment of the present invention in which the amplitude of the half-frequency whirl characteristic of a fluid bearing is utilized as the input parameter into HDD failure prediction system 200. The process begins at step 302 which signifies that runtime operation of HDD 203 has begun. Although not explicitly depicted in flow diagram 300, a baseline half-frequency whirl of the fluid bearing within HDD 203 has been measured utilizing either at the time HDD 203 was manufactured/assembled, or after HDD 203 was installed. An external transducer device that is permanently affixed to the drive enclosure or the drive's circuit card or supporting mechanical structure which can be utilized to sense the spindle vibration may be utilized to measure the baseline half-frequency response. The measured baseline half-frequency response is stored within memory 208.

Turning back to FIG. 2, it should be noted that although HDD failure prediction system 200 is depicted as including a single HDD 203, the present invention is equally applicable to multiple drive configurations such as RAID systems. In such cases, it may be preferable to measure and record the baseline half-frequency whirl for each drive after all of the drives have been mounted and activated. obtaining a baseline response in this manner will ensure that mutual vibration disturbances among the drives are accounted for.

After HDD runtime operations have commenced as illustrated at step 302, the runtime vibration level of a fluid bearing within HDD 203 is detected and measured as illustrated at step 304. Next, as illustrated at steps 306 and 308, the amplitude of the runtime half-frequency whirl of the fluid bearing is derived from the runtime vibration level measured at step 304 and is then compared, at suitable intervals of time, with the amplitude of the baseline response stored in memory 208. As depicted at step 310, if the runtime amplitude falls within a predetermined baseline threshold, the monitoring of the fluid bearing will continue at step 304. If the runtime amplitude deviates from the stored baseline amplitude such that it is outside of the baseline threshold, the process continues at step 312 which depicts a response from PFA block 232 to the "error" condition. A failure warning will be posted by PFA block 232 and the process ends at step 314 at which point either HDD 203 may be deactivated, or customer data may be transferred from HDD 203 to another HDD.

Figure 3B:
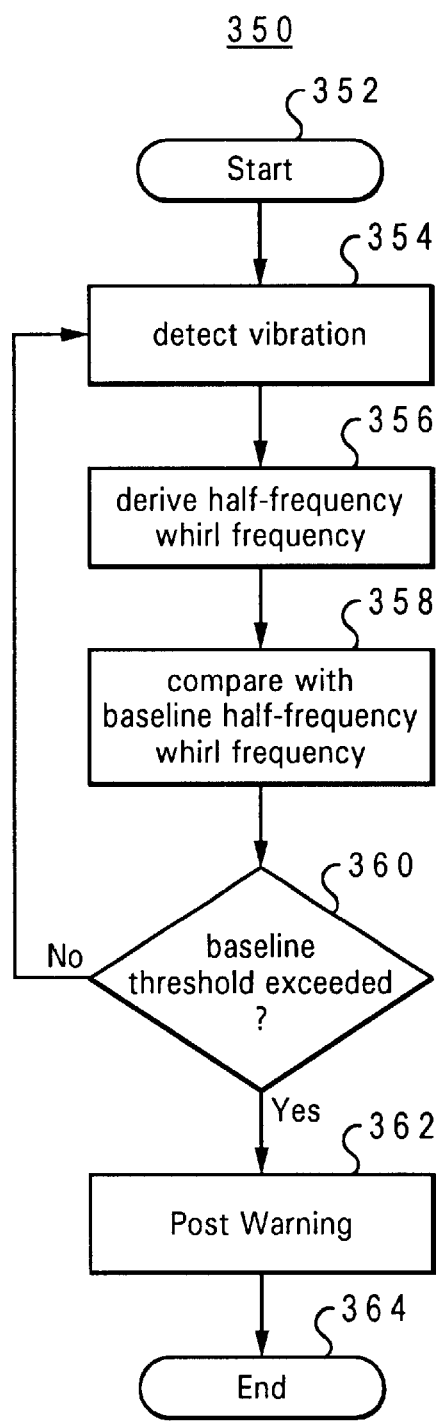
FIG. 3B is a high level flow chart illustrating a sequence of steps that that encompass one embodiment of the present invention in which the frequency of the half-frequency whirl characteristic of a fluid bearing is utilized as the input parameter into a PFA system.

FIG. 3B is a high level flow chart 350 illustrating a sequence of steps that that encompass an alternate embodiment of the present invention in which the frequency of the half-frequency whirl characteristic of a fluid bearing is utilized as the input parameter into a PFA system. As in FIG. 3A, the process depicted by flow diagram 350 is preceded by the step of measuring and recording a baseline half-frequency whirl response for a HDD. After the HDD is activated as illustrated at step 352, a suitable detection device, such as a transducer is utilized to detect the vibration level of a fluid bearing within the HDD during runtime operations as depicted at step 352. Next, at steps 356 and 358, the frequency at which the half-frequency whirl response occurs (the half-frequency whirl frequency) is derived from the detection at step 354 and compared with the baseline half-frequency whirl frequency. As shown at step 360, as long as the differential between the runtime frequency and the baseline frequency remains within a pre-determined threshold, the monitoring process from step 354 through step 360 will continue. If, however, this differential exceeds the pre-determined threshold, a warning will be posted to enable necessary protective action at step 362 and the process will terminate at step 364.

By tracking a parameter that does not directly bear on drive performance, the present invention provides a means to address gradual degradation leading to failures that were previously unaddressable.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described in association with FIGS. 3A and 3B can be accomplished with a computer-aided device. In such a method, data stored in a memory unit of a data-processing system such as a data-processing system, can represent steps in a method for implementing a preferred embodiment of the present invention.

What is claimed is:

1. A method within a data storage system for predicting failure of a disk drive having a fluid bearing during runtime operation of said disk drive, wherein said fluid bearing has a baseline dynamic fluid response, said method comprising:

measuring and recording a baseline half-frequency whirl frequency of said fluid bearing;

measuring a runtime vibration of said fluid bearing during operation of said disk drive;

translating said runtime vibration into a runtime dynamic fluid response of said fluid bearing, wherein said translating includes determining a runtime half-frequency whirl frequency from said measured runtime vibration;

comparing said runtime half-frequency whirl frequency with said baseline half-frequency whirl frequency; and commencing a protective response to a predetermined departure of said runtime half-frequency whirl frequency from said baseline half-frequency whirl frequency, such that data loss within said data storage system due to fluid bearing failure is prevented.

2. The method of claim 1, wherein said protective response includes commencing an automatic data recovery procedure.

3. The method of claim 1, wherein said protective response includes indicating a prospective catastrophic failure.

4. The method of claim 1, wherein changes in said runtime dynamic fluid response provides an indication of the operating condition of said fluid bearing, and wherein commencing a protective response is preceded by obtaining an indication of the operating condition of said fluid bearing in response to comparing said runtime dynamic fluid response with said baseline dynamic fluid response.

5. The method of claim 1, wherein said baseline dynamic fluid response is defined in terms of a half-frequency whirl characteristic, and wherein translating said runtime vibration further comprises deriving said half-frequency whirl characteristic from a runtime vibration level.

6. The method of claim 5, wherein said fluid bearing supports a shaft having a rotational shaft speed during operation of said disk drive, and wherein deriving said half-frequency whirl characteristic comprises the steps of:

transducing said runtime vibration into an electric response signal, said electric response signal having components that resonate at ratios of said rotational shaft speed; and band-pass filtering said electric response signal to obtain a component of said electric response signal at approximately one-half of said rotational shaft speed.

7. The method of claim 1, wherein said baseline dynamic fluid response is defined in terms of a baseline half-frequency whirl amplitude, and wherein measuring a runtime vibration level is preceded by the steps of:

measuring and recording a baseline half-frequency whirl amplitude of said fluid bearing.

8. The method of claim 7, wherein said runtime dynamic fluid response is defined in terms of a runtime half-frequency whirl amplitude, said method further comprising the steps of:

determining said runtime half-frequency whirl amplitude from said measured runtime vibration level;

comparing said runtime half-frequency whirl amplitude with said baseline half-frequency whirl amplitude; and in response to a predetermined departure of said runtime half-frequency whirl amplitude from said baseline half-frequency whirl amplitude, commencing a protective response, such that data loss within said data storage system due to fluid bearing failure is prevented.

9. The method of claim 1, wherein said data storage system is a multi-drive array having a designated slot for mounting said disk drive and wherein measuring and recording a baseline half-frequency whirl frequency of said fluid bearing further comprises the steps of:

mounting said disk drive at said designated slot within said multi-drive array; and measuring and recording a signature baseline half-frequency whirl frequency of said fluid bearing within said disk drive while said multi-drive array is activated.

10. A data storage subsystem for predicting failure of a disk drive having a fluid bearing during runtime operation of said disk drive, wherein said fluid bearing has a baseline dynamic fluid response, said storage subsystem comprising:

means for measuring and recording a baseline half-frequency whirl frequency of said fluid bearing;

means for measuring a runtime vibration of said fluid bearing during operation of said disk drive;

means for translating said runtime vibration into a runtime dynamic fluid response of said fluid bearing, wherein said translating includes determining a runtime half-frequency whirl frequency from said measured runtime vibration;

means for comparing said runtime half-frequency whirl frequency with said baseline half-frequency whirl frequency; and means for commencing a protective response to a predetermined departure of said runtime half-frequency whirl frequency from said baseline half-frequency whirl frequency, such that data loss within said data storage system due to fluid bearing failure is prevented.

11. The data storage subsystem of claim 10, wherein said fluid bearing is a spindle fluid bearing.

12. The data storage subsystem of claim 10, wherein said means for measuring a runtime vibration is a transducer.

13. The data storage subsystem of claim 10, wherein said means for translating said runtime vibration into a dynamic fluid response is a digital signal processor.

14. The data storage subsystem of claim 10, wherein said means for commencing a protective response compromises executable program instructions.

15. The data storage subsystem of claim 14, wherein said executable program instructions are predictive failure analysis instructions.

16. The storage subsystem of claim 10, wherein said baseline dynamic fluid response is defined in terms of a half-frequency whirl characteristic, and wherein said means for translating said runtime vibration further comprises means for deriving said half-frequency whirl characteristic from a runtime vibration level.

17. The data storage subsystem of claim 16, wherein said fluid bearing supports a shaft having a rotational shaft speed during operation of said disk drive, and wherein said means for deriving said half-frequency whirl characteristic comprises:

means for transducing said runtime vibration into an electric response signal, said electric response signal having components that resonate at ratios of said rotational shaft speed; and means for band-pass filtering said electric response signal to obtain a component of said electric response signal at approximately one-half of said rotational shaft speed.

18. The data storage subsystem of claim 10, further comprising:

means for measuring and recording a baseline dynamic fluid response of said fluid bearing; and means for recording a baseline amplitude of said baseline dynamic fluid response.

19. The data storage subsystem of claim 18, further comprising:

means for determining a runtime amplitude of said runtime dynamic fluid response;

means for comparing said runtime amplitude with said baseline amplitude; and means for commencing a protective response to a predetermined departure of said runtime amplitude from said baseline amplitude, such that data loss within said data storage system due to fluid bearing failure is prevented.

* * * * *